Patented Apr. 10, 1923.

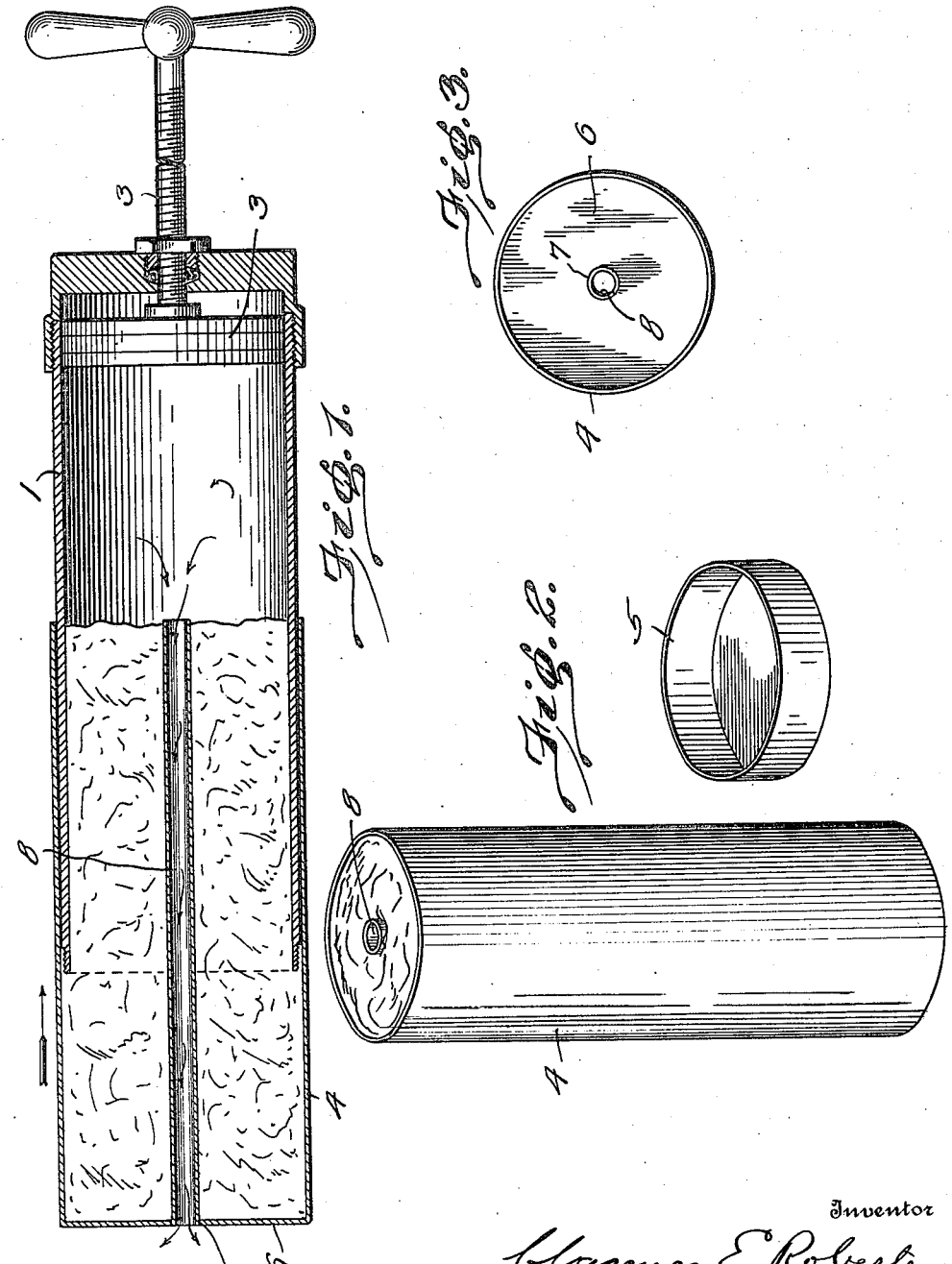

1,451,114

UNITED STATES PATENT OFFICE.

CLARENCE E. ROBERTS, OF HAGERSTOWN, MARYLAND.

LOADING CARTRIDGE FOR GREASE GUNS.

Application filed September 13, 1920. Serial No. 409,882.

*To all whom it may concern:*

Be it known that I, CLARENCE E. ROBERTS, a citizen of the United States, residing at Hagerstown, in the county of Washington, and State of Maryland, have invented certain new and useful Improvements in Loading Cartridges for Grease Guns, of which the following is a specification.

Of recent years a system of lubrication of automobiles, and other machinery, has been more or less universally adopted which consists of forcing, under considerable pressure, the lubricant into and through the bearings, and for this purpose a grease gun has been adopted provided with a piston having a screw threaded stem whereby the piston is forced positively against the grease to expel the grease from the gun through a flexible tube into the bearing. Considerable difficulty has been experienced in the refilling of these guns because of the fact that in introducing grease in refilling the gun air is trapped in the gun below the grease and it is very difficult to pack the grease solid throughout the entire cubic capacity of the gun. Many expedients have been presented to overcome this objection and the inconvenience in refilling the grease gun but they all involve either a change in the shape of the gun or a funnel from which the grease is expelled into the gun by means of a paddle. The object of my invention is to adapt a grease cartridge for use in connection with the commercial grease gun which does not require any change whatever in the grease gun; and with this and other objects in view my invention consists of the parts and combination of parts as will be hereinafter more fully set forth.

In the drawings:

Figure 1 is a longitudinal sectional view of a grease cartridge being applied.

Figure 2 is a perspective view of a cartridge with the cover removed.

Figure 3 is an end view of the major part of the cartridge empty.

The reference numeral 1 designates a commercial grease gun and a piston and stem 3 which stem is in screw thread engagement with the cap of one end of the gun. My improved grease cartridge comprises a cylindrical shell 4 having a cubic capacity substantially equal to that of the grease chamber of the gun, said shell being open at one end which open end is provided with a detachable cap 5. The other end of the shell has a closed bottom 6 through which is formed a port 7. 8 is an elongated tubular passage extending from the port 7, within the shell, to a point substantially in the plane of the open end of the shell whereby when the detachable cap 5 is mounted on the end of the shell 4 it closes the upper end of the passage 8. The diameter of the shell 4 is such that when one of the caps is removed from the end of the grease gun the grease gun body can be telescoped within the cartridge shell.

The cartridges are filled with grease while the grease is in semi-liquid form whereby the grease is firmly packed within the cartridge and the cap 5 is then placed upon the cartridge and the cartridge is ready for distribution and sale.

In refilling a gun with, the cartridge construction according to my invention, one of the caps of the grease gun is removed and the detachable lid is removed from the cartridge and the end of the grease gun is then inserted in the cartridge and pressure is applied to the closed end of the cartridge by the hand which forces it over the grease gun until the entire contents of the cartridge is emptied into the grease gun. To facilitate the telescoping of the two bodies and the solid packing of the grease in the grease gun I provide the elongated air passage 8 and air outlet 7 whereby the air trapped by the closed end of the grease gun and the body of grease in the cartridge readily escapes through this passage and port. After the cartridge has been pushed to its limit on the grease gun it is then removed leaving the solid pack of grease within the gun; the elongated passage 8 slips very readily through the body of grease without dragging it as the cartridge is removed from the grease gun.

My invention provides a very ready means for filling grease guns and by it a grease gun may be filled without soiling the hands. Extra cartridges may be carried very conveniently in the automobile for use on the road when one is taking a long trip.

It is obvious that changes may be made in the details of construction and relative arrangement of the parts without departing from the scope of the invention as set forth in the appended claims.

What I claim is:

1. A grease cartridge for a lubricating gun comprising a shell having a closed end, and adapted to telescope with the body of the gun, the closed end being provided with means permitting the escape of air from the gun as the gun and shell are being telescoped.

2. A grease cartridge for a lubricating gun comprising a shell having a closed end, and adapted to telescope with the body of the gun and a port extending a substantial distance from the closed end into the shell whereby air may escape from the gun as the gun and shell are being telescoped.

3. A grease cartridge for a lubricating gun comprising a shell open at one end and closed at the other end, and an air exhaust port leading from the open end of the shell to the closed end thereof.

4. A grease cartridge for a lubricating gun comprising a shell open at one end and closed at the other end, an air exhaust port through the closed end, and a passage way leading from the open end and opening into said port.

5. A grease cartridge for a lubricating gun comprising a shell open at one end and closed at the other end, an air exhaust tube extending from the open end to and through the closed end.

6. A grease cartridge for a lubricating gun comprising a shell closed at one end and open at the other end, an elongated air exhaust port extending through the closed end into the shell to a point approximately in the plane of the open end of the shell, and a detachable cap adapted to close the open end of the shell.

In testimony whereof I affix my signature.

CLARENCE E. ROBERTS.